United States Patent

[11] 3,633,162

[72] Inventor Heinz H. Findeisen
Milford, Mass.
[21] Appl. No. 60,683
[22] Filed Aug. 3, 1970
[45] Patented Jan. 4, 1972
[73] Assignee Honeywell Inc.
Minneapolis, Minn.

[54] APPARATUS FOR CORRECTING AND INDICATING ERRORS IN REDUNDANTLY RECORDED INFORMATION
17 Claims, 14 Drawing Figs.

[52] U.S. Cl. .......... 340/146.1, 340/174.1 B
[51] Int. Cl. .......... G06f 11/08, G06j 5/00
[50] Field of Search .......... 340/146.1, 174.1 B; 178/23; 235/153

[56] References Cited
UNITED STATES PATENTS

| | | | |
|---|---|---|---|
| 3,078,448 | 2/1963 | O'Brien | 340/146.1 X |
| 3,281,804 | 10/1966 | Dirks | 340/174.1 |
| 3,320,598 | 5/1967 | Star | 340/174.1 |

*Primary Examiner*—Charles E. Atkinson
*Attorneys*—Fred Jacob and Leo Stanger

ABSTRACT: Apparatus for recovering double-frequency-encoded information words redundantly recorded on two tracks of a magnetic medium, including means for separating clock bits and data bits of the information words to produce redundant data words and including means for combining the data words to produce a data word corrected for the absence of a data bit in one of the information words. Means for indicating dissimilarities in like position data bits in the redundant data words is also disclosed. Additionally, a word end marker comprising dissimilar parity bits in each of the information words is checked with the parity of the corrected data word and produces an error signal for any dissimilarities therebetween.

INVENTOR
HEINZ H. FINDEISEN
BY
John S. Solakian
ATTORNEY

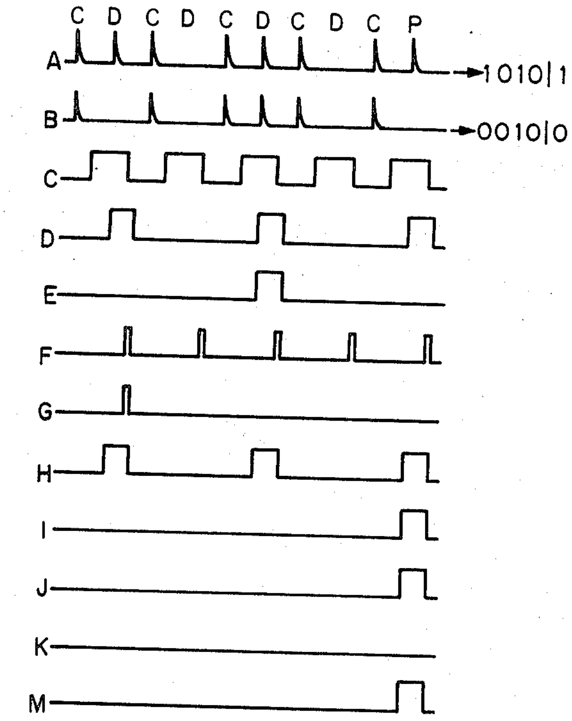
Fig. 3.
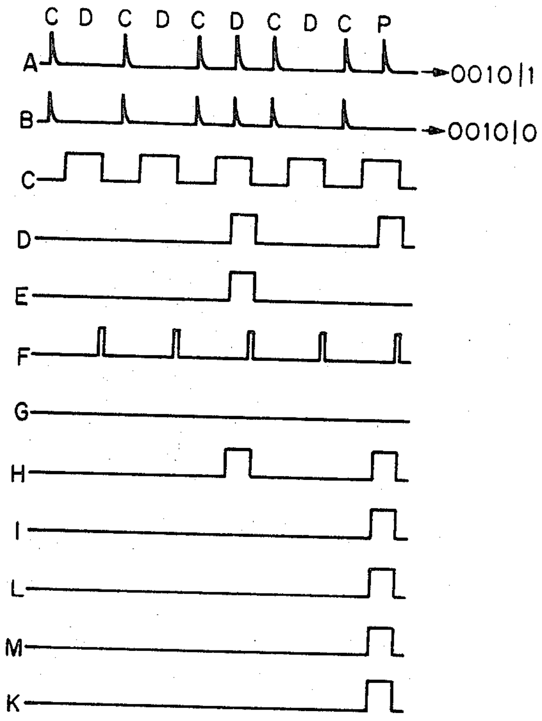
Fig. 4.
1010|1 / 1010|0 → 1010 → OK
Fig. 5A.
1010|1 / 0010|0 → 1010 → DBE
Fig. 5B.
0010|1 / 0010|0 → 0010 → WSE
Fig. 5C.
1000|1 / 0010|0 → 1010 → 2-DBE
Fig. 5D.
0000|1 / 0010|0 → 0010 → DBE+WSE
Fig. 5E.
1010|0 / 1010|0 → 1010 → WEME
Fig. 5F.
1000|0 / 1010|0 → 1010 → DBE+WEME
Fig. 5G.
1110|1 / 1010|0 → 1110 → DBE+WSE
Fig. 5H.
1010|0 / 1110|1 → 1110 → DBE
Fig. 5I.
1010|0 / 1010|1 → 1010 → WSE
Fig. 5J.
INVENTOR
HEINZ H. FINDEISEN
BY
John S. Solakian
ATTORNEY

APPARATUS FOR CORRECTING AND INDICATING ERRORS IN REDUNDANTLY RECORDED INFORMATION

BACKGROUND OF THE INVENTION

Field of the Invention

The present invention relates to magnetic recording and more particularly to apparatus for maintaining a high degree of reproduction accuracy in magnetic tape-recording systems.

Description of the Prior Art

In systems for recording digital information on a magnetic medium such as magnetic tape and for reproducing the recorded signal, it is desirable to have high operating speeds, high information-packing densities, and very high accuracy, especially where such magnetic medium is utilized with electronic computers. Such magnetic medium however, in addition to being costly, has certain undesirable properties such as not being magnetically uniform throughout its length, such as being magnetically unusable after repeated usage, and such as producing spurious reproduction signals created by erroneously recorded magnetic spots or through radiated interference or the like. In addition, magnetic tape when used in an uncontrolled environment is susceptible to bit dropout due to the introduction of stray dust particles and the like. It will be readily understood that in electronic computers and the like, the entry of an erroneous bit of information or the failure to enter a bit of information will greatly affect the accuracy of a computation. Great care must be taken to insure that information transmitted to a magnetic tape actually is recorded thereon or at least is corrected for with the error indicated upon recovery of such information from the magnetic medium.

It is known to achieve high accuracy by recording the same digital information redundantly on both of two separate tracks on the recording medium and when reproducing to couple the information signals from both tracks to an output terminal or utilization device. However, none of the apparatus taught by the prior art can either singly or in combination correct for the absence of one or more missing bits in an information word as well as indicate the loss of a data bit, nor does the prior art show means for generating an error signal indicative of a loss in the word synchronization.

It is therefore an object of the present invention to provide an improved apparatus for recovering redundantly recorded information.

It is another object of the invention to provide apparatus for correcting data words redundantly recorded on dual tracks of a magnetic medium.

It is a further object of the invention to provide apparatus for recovering redundantly recorded information, correcting for an erroneous recording of signals therein, and for indicating the type of error causing the need for correction.

SUMMARY OF THE INVENTION

The purposes and objects of the invention are satisfied by providing apparatus for recovering information words redundantly recorded on a dual-track magnetic medium. The information words are recorded utilizing double-frequency encoding wherein the information words include alternate clock and data bits. The presence of a data bit indicates a first binary number and the absence of a data bit indicates a second binary number. The apparatus comprises means for receiving the information words from each of the tracks and for generating first and second data words respectively with the clock bits removed therefrom, and means for correcting for the absence of a data bit in one of the data words of a data bit representative of the first binary number and thereby generating a corrected data word therefrom. In addition, the apparatus may include means for detecting dissimilarities in like-positioned data bits of the first and second data words and for generating a data bit error signal indicative thereof. Further, the recorded information words may include a word end marker wherein the marker includes a parity bit in each of the information words, one of the parity bits representative of a first binary number and the other of the parity bits representative of a second binary number so as to indicate an even or odd parity code and wherein the means for receiving and for generating retains the parity bits with said data bits in each of the data words so that a word sync error signal will be generated if the parity of the corrected data word and the parity indicated by the word end marker are dissimilar.

BRIEF DESCRIPTION OF THE DRAWINGS

The advantages of the foregoing configuration of the present invention will become more apparent upon reading the accompanying detailed description in conjunction with the figures in which:

FIG. 3 is a timing diagram which describes the operation of the apparatus in FIG. 1 when a data bit error is generated;

FIG. 4 is a timing diagram which describes the operation of the apparatus in FIG. 1 when a word sync error is generated; and FIGS. 5A through 5J illustrate in notational form various errors which may be introduced and the error correction and indication generated by the apparatus shown in FIG. 1.

DESCRIPTION OF THE PREFERRED EMBODIMENTS

Figures 1, 2:
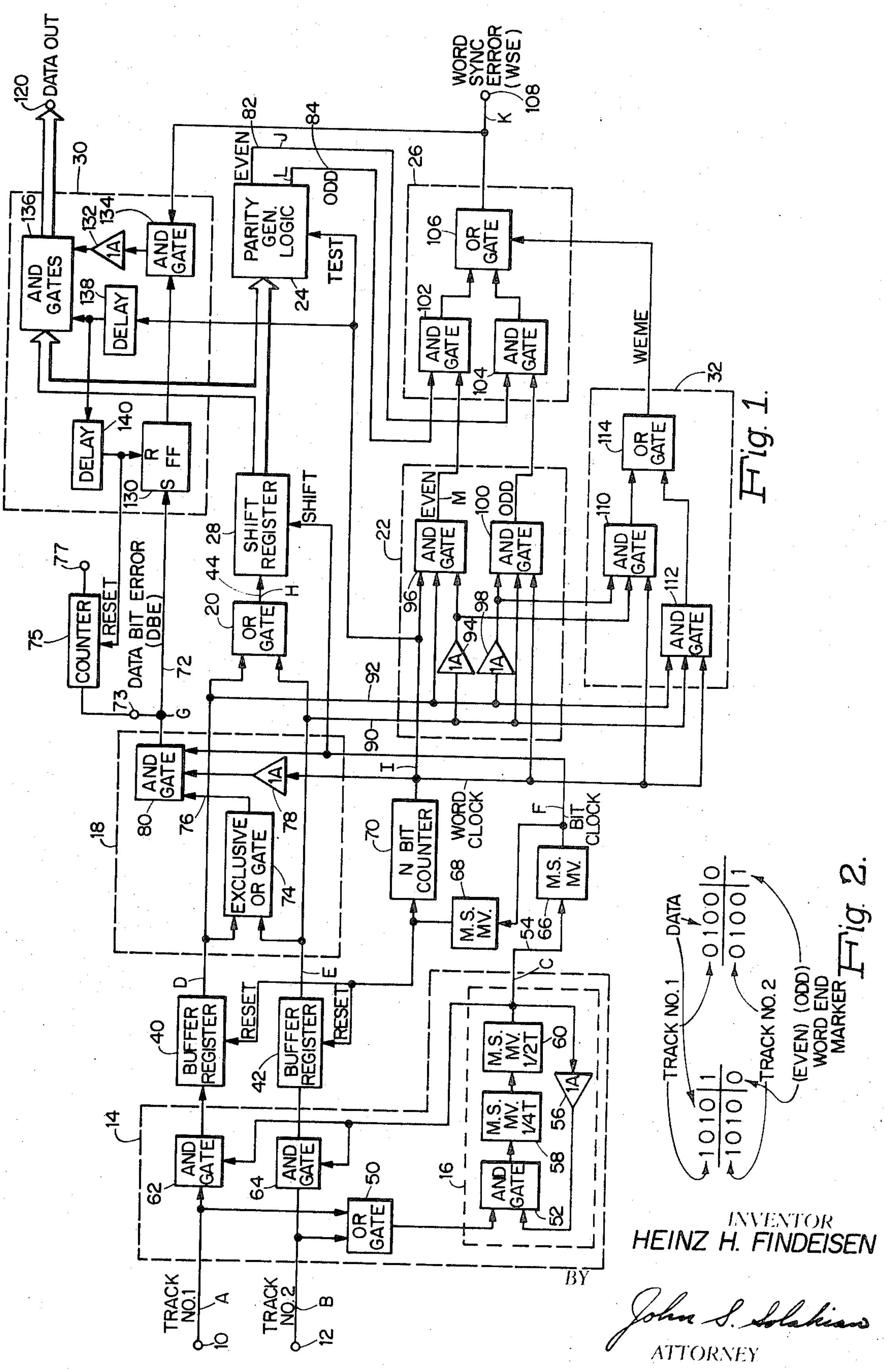
FIG. 1 is a schematic block diagram illustrating the apparatus of the present invention.
FIG. 2 illustrates in notational form the composition of the data words and word end marker utilized in conjunction with the apparatus of the invention.

The preferred embodiment shown in FIG. 1 includes input terminals 10 and 12 for receiving information words from a dual-track redundant recording. Such information words are shown in notational form in FIG. 2 and for purposes of illustration, each include four data bits and a word end marker. The clock bits which alternate with the data bits and with the word end marker or parity bits are not shown. The word end marker comprises dissimilar parity bits. If the first four data bits have even parity as originally recorded, then the word end marker will be a binary 1 and a binary 0 for tracks 1 and 2 respectively. If such parity is odd then the word end marker parity bits will be reversed. The notational form of the information words in FIG. 2 shows redundant words indicating a binary number 1010. The word end marker is indicated as a binary 1 for track one and a binary 0 for track two since the bits of the information words are an even parity. The notation following the notational form of the information words indicates the corrected data word as would appear in register 28.

The clock bits are separated from the information word by means of circuit 14 which enables transfer of the information word bits serially through one-bit buffer registers 40 and 42. Like position data bits are compared by means of circuit 18 which produces a data bit error signal if such like position data bits are dissimilar. The word end marker bits as indicated at the last bit in the information word are compared by circuit 22 so as to indicate either the even or odd parity of the originally recorded redundant information words. Circuit 32 compares the word end marker bits for similarity therebetween and generates a word end marker error signal if this condition exists.

The like positioned data bits are combined via OR gate 20 to produce a corrected data bit on line 44 which corrected data bits are shifted into shift register 28 wherein a full data word will be stored. The parity of the corrected data word now in shift register 28 will be generated by parity generator logic 24, the output of which is compared with the indicated outputs of the word end marker parity indicator circuit 22. This comparison is performed in circuit 26 which generates a word sync error signal for dissimilarities between the aforementioned parity indications. A word end marker error may also generate a word sync error signal. Data transfer to a utilizing device may be inhibited by means of circuit 30 upon receipt of both a word sync error or a data bit error or any combination thereof. Timing throughout the apparatus of FIG. 1 is performed by means of a word clock and a bit clock which are generated by means of circuit 16 in separator circuit 14 and by multivibrators 66 and 68 and counter 70.

In operation, the clock and data bits received on input terminals 10 and 13 are combined via OR-gate 50 and transferred to the input of AND-gate 52. Circuit 16 of which AND-gate 52 is included will generate a timing signal on line 54 which starts after one-quarter of the period, which period includes a clock bit cell followed by a data bit cell, and which timing signal ends after three-quarters of the period has elapsed. Thus, with the output of inverting amplifier 56 high, AND-gate 52 will trigger the monostable multivibrator 58 whose output one-quarter of a period later will trigger monostable multivibrator 60 which will generate a timing signal on line 54 lasting for one-half of the period. During such last-mentioned half-period, the output of inverting amplifier 56 will be low and will inhibit the functioning of AND-gate 52 during the data bit cell time.

The timing signal on line 54 is the enable input to AND-gates 62 and 64 whose other inputs are the information words received on input terminals 10 and 12 respectively. AND-gates 62 and 64 are inhibited during the clock bit cell time and are enabled during the data bit cell time at which time the data bits are transferred serially into buffer registers 40 and 42 respectively.

The buffer registers 40 and 42 are reset after receipt of such data bits by means of monostable multivibrators 66 and 68. Multivibrator 66 produces a bit clock of short duration upon receipt of the trailing edge of the timing signal on line 54. Multivibrator 68 produces a short duration pulse upon receipt of the trailing edge of the bit clock. Such pulse resets buffer registers 40 and 42 after the bit clock time and increments an N-bit counter 70 which is utilized to indicate the time of the end of word marker, on the word clock line.

Each data bit received in registers 40 and 42 is combined in OR-gate 20 or similar combining means so that a corrected data bit will appear on line 44. That is, if an originally recorded binary ONE signal is not received on one of the information tracks it will nevertheless appear as corrected on line 44. At the same time, such like position data bits are compared for similarity and will produce a data bit error on line 72 for any dissimilarities therebetween. The number of data bit errors for each data word may be indicated by a counter 75 and its output terminal 77. Exclusive OR-gate 74 receives both like position data bits and will generate a signal on line 76 if such bits are dissimilar. For timing purposes, the word clock inverted by amplifier 78 and the bit clock are coupled with line 76 to the inputs of AND-gate 80 whose output is line 72. For like position data bits of similar binary numbers a data bit error signal will not be generated.

Each of the corrected data bits on line 44 is shifted into shift register 28 at the bit clock time. Once the corrected data bit word is loaded into register 28, a test will be performed at the word end marker time as indicated at counter 70. The parity generator logic 24 will produce a pulse on line 82 if the parity of the corrected data bit word is even or a pulse on line 84 if such parity is indicated as odd. Such parity generator logic circuits are well known in the art and may be a Honeywell Parity Generator Pac, Model PG–340. Simultaneously, with the test performed by logic 24, circuit 22 is utilized to indicate the parity of the word end marker as originally recorded on a magnetic medium. As stated before, for a word end marker which has an even parity indication, a binary 1 will appear on line 92 and a binary 0 will appear on line 90. A binary 0 on line 90 will be inverted by inverting amplifier 94 so that all logical ONES are presented to AND-gate 96, which gate will then produce an even word end marker indication. Similarly an odd indication of the word end marker will be indicated by means of inverting amplifier 98 and AND-gate 100. The outputs of AND-gate 96 and AND-gate 100 are compared with the output lines 84 and 82 respectively of logic 24. This comparison is performed in circuit 26 by means of AND-gates 102 and 104 which will produce an output signal to OR-gate 106 for dissimilarities at their inputs. In such case, OR-gate 106 will produce a word sync error signal at terminal 108. Thus, if an even parity is generated by logic 24 and an odd parity of the word end marker is indicated by circuit 22 a word sync error will be generated.

In addition, if the word end marker bits are both indicative of a binary 0, or a binary 1, this condition will be sensed by AND-gates 110 and 112 respectively, which condition will produce a word end marker error via OR-gate 114. The word end marker error may be combined with OR-gate 106 to also produce a word sync error.

The data in shift register 28 will be transferred through output terminal 120 to a utilizing device by means of circuit 30 only under desirable conditions. As shown by way of example, the data will be transferred to terminals 120 if a data bit error has not occurred during the data word time and if a word sync error has not occurred during such time. If a data bit error and a word sync error occur during a data word time, flip-flop 130 will be set by the data bit error and will enable one input of AND-gate 134, the other input to AND-gate 134 will be enabled by the word sync error thereby presenting a logical ZERO to one input of AND-gates 136 via inverting amplifier 132 thereby preventing transfer of data to terminals 120. The word clock is received after a slight delay generated by delay circuit 138 in order to avoid a race condition. This signal resets flip-flop 130 via delay 140 after the corrected data word, there being no error signals generated, has had time to be transferred to a utilizing device via terminals 120. The signal on the output of delay 138 is further delayed by delay 140 to reset flip-flop 130 and counter 75.

Thus, it has been seen that if for any reason a binary number indicative of a logical ONE is missing from one of the information words received on input terminals 10 and 12, that the apparatus of the invention will correct for such condition and will indicate a data bit error. It has also been seen that the addition of a unique word end marker may be utilized to generate a word sync error if there is a similarity between the parity of the corrected data word and the word end marker recorded on the magnetic medium. It can also be seen that the occurrence of a data bit error without a word sync error and vice versa would probably in most circumstances not require the cancellation of the information word received. That is, the likelihood of a dropout of a data bit from the data word in more than one bit position of a given data word is unlikely. Also, erroneous addition of a data bit indicative of a binary ONE is unlikely. In addition, the occurrence of a word sync error without a data bit error would probably indicate that the parity of the word end marker itself was at fault and that the data word is correct. That is, the likelihood that a data bit indicative of a binary ONE is missing from like positions in the two information words is unlikely.

Another feature of the invention is that the absence of a clock bit at like positions in each of the information words received at terminals 10 and 12 will be detected and indicated as a word sync error. For example, if like position clock bits are missing, enabling input signals to AND-gate 52 will not be received, and the timing signal on line 54 will not be generated during the data bit time. Accordingly, the next data bits will not pass through AND-gates 62 and 64. If the next data bits were binary ONES, then a word sync error would subsequently be generated because of the likelihood in similarity in parity between the corrected data word received from shift register 28 and the word end marker received from lines 90 and 92. Thus, if such data bits were binary ONES, the OR-gate 50 would pass a pulse to AND-gate 52 and from thereon, the data bits would look like clock bits to circuit 16. Accordingly, the timing signal on line 54 will be delayed, resulting in such likelihood in similarity.

If the next data bits were representative of binary ZEROS, they also would not be passed through AND-gates 62 and 64. The next received clock bits would then function with circuit 16 in accordance with the desired result. However, a complete data bit position has been skipped and the N-bit counter 70 will not generate the word clock until one data bit position after the word end marker. Such next data bit would necessarily be comprised of similar data bits in each of the next information words received or may be simply the absence of information which will be indicative of a binary ZERO. This similarity of binary conditions on lines 90 and 92 will be detected by circuit 32 which will again generate a word end marker error. Of course, the absence of a single clock bit received on either terminal 10 or 12 will not be detected and more important, will not result in an erroneous data word at terminals 120.

Now referring to FIG. 3, there is illustrated a timing diagram which exemplifies the generation of a data bit error. Waveforms A and B, also indicated in notational form, are received on terminals 10 and 12 respectively. Waveform B includes a missing data bit at the first data bit position. Parity of the word end marker is indicated as even. Circuit 16 generates the waveform C which results in the data bit waveforms of D and E respectively at the outputs of registers 40 and 42. The bit clock is shown as waveform F whereas the word clock is shown as waveform I. The corrected data bits are shown as waveform H. The data bit error signal is shown as waveform G. Waveform J indicates the even parity generated by logic 24 and results in the absence of a word sync error as indicated by waveform K. Waveform M is shown to indicate the even parity of the word end marker as indicated by circuit 22. Because waveform M is high and waveform L, not shown, is low, an output will not be generated at AND-gate 102 and in addition, since waveform J is high, and the output of AND-gate 100 is low, there will also be no output from AND-gate 104. Thus, no word sync errors will be generated.

The waveforms of FIG. 4 are presented to illustrate the process of generating a word sync error. Waveforms A and B are shown as in FIG. 3 wherein both first-occurring data bits are absent and parity indication of the word end marker is even. Again, the waveforms A and B are shown in the notational form. Waveforms D and E are generated by the combination of waveforms A, B, and C. The data bit error waveform G is not generated because all data bits are similar. The corrected data bits are shown as waveform H but, such bits are not truly corrected. Because the parity of the corrected data bits shown in waveform H is odd, waveform L is generated. Since the indicated parity of the word end marker is even, waveform M will result. The combination of waveforms L and M result in a word sync error as shown by waveform K.

Now referring to FIGS. 5A through 5J, the data bits and word end marker bits for both data tracks are indicated in notational form. The notation of FIG. 5A is the desired condition for the notations of FIGS. 5B through 5J. FIGS. 5B and 5C repeat the notations indicated in FIG. 3 and FIG. 4 respectively. FIG. 5D illustrates the case wherein two data bit errors are generated and wherein the corrected data word in register 28 is the desired word. FIG. 5E illustrates the case wherein both a data bit error and a word sync error are generated. FIG. 5F illustrates the word end marker error example whereas FIG. 5G in addition indicates a data bit error condition. In the above examples, the dropout of a data bit representative of a binary ONE has been illustrated. In FIGS. 5H and 5I, an addition of an erroneous data bit is indicated. FIG. 5H indicates both a data bit error and a word sync error whereas FIG. 5I indicates a data bit error only. FIG. 5J illustrates the dropout and the addition of the parity bits in the word end marker resulting in a word sync error.

As previously discussed, the probability of having a data bit indicative of a binary ONE dropout from like positions in each of the information words is unlikely and in addition the probability that a data bit indicative of a binary one is erroneously added is also unlikely. In such case, only the condition of both a word sync error and data bit error occurring within the same word time frame should control the inhibit function of circuit 30 wherein the corrected data word is not transferred to a utilizing device. However, it can be understood that certain error conditions may be in actual practice more frequent than others and that such inhibit function may be altered to suit the best statistical probabilities for a given system. It should also be understood that the apparatus of the present invention may be utilized with more than two redundantly recorded tracks of information without departing from the scope of the invention. For example, in a three-track redundant system the apparatus as shown in FIG. 1 may be duplicated in part so that a plurality of error signals may be generated. For example, the combination of tracks 1 and 2, 2 and 3, and 1 and 3 may each generate their own error signals. A logic network could be arranged to check for redundancy of more than one like error signal in which case a true error signal would be generated. If the case is that only one of such combinations generates an error signal, then such error condition could be discarded.

The invention has been particularly shown and described with reference to the preferred embodiment. However, modifications and variations of the invention are possible in the light of the above teachings. It is therefore understood that within the scope of the appended claims the invention may be practiced otherwise as specifically described.

Having now described the invention what is claimed as new and novel and for which it is desired to secure Letters Patent is:

1. Apparatus for recovering information words redundantly recorded on a dual-track magnetic medium, said information words recorded utilizing double-frequency encoding wherein said information words include alternate clock and data bits, the presence of a data bit indicating a first binary number and the absence of a data bit indicating a second binary number, said apparatus comprising:

A. means for receiving said information words from each of said tracks and for generating first and second data words respectively with said clock bits removed therefrom; and B. means for correcting for the absence of a data bit in one of said data words of a data bit representative of said first binary number and thereby generating a corrected data word therefrom.

2. Apparatus as defined in claim 1 further including means for detecting dissimilarities in like-positioned data bits of said first and second data words and generating a data bit error signal indicative thereof.

3. Apparatus as defined in claim 2 further including means for generating a parity signal indicative of said corrected data word.

4. Apparatus as defined in claim 3 further including means for comparing said generated parity signal with the actual parity of said information words received from said magnetic medium.

5. Apparatus as defined in claim 4 further including means for generating a word sync error signal if said comparison is not true.

6. Apparatus as defined in claim 5 further including means for inhibiting the transfer of said corrected data word to a utilizing device when said data bit error signal and said word sync error signal occur during a given data word time frame.

7. Apparatus as defined in claim 1 wherein said recorded information words include a word end marker wherein said marker includes a parity bit in each of said information words, one of said parity bits representative of a first binary number and the other of said parity bits representative of a second binary number so as to indicate an even or odd parity and wherein said means for receiving and for generating retains said parity bits with said data bits in each of said data words.

8. Apparatus as defined in claim 7 further including means for detecting similarities in said parity bits and thereby generating a word end marker error signal.

9. Apparatus as defined in claim 8 further including means for detecting dissimilarities in like-positioned data bits of said first and second data words and generating a data bit error signal indicative thereof.

10. Apparatus as defined in claim 9 further including means for inhibiting the transfer of said corrected data word to a utilizing device where said data bit error signal and said word end marker error signal occur during a given data word time frame.

11. Apparatus as defined in claim 7 further including:

A. means for detecting said parity of said word end marker;

B. means for generating a parity signal indicative of said corrected data word; and C. means for generating a word sync error signal when said parity and said parity signal are dissimilar.

12. Apparatus as defined in claim 11 further including means for detecting dissimilarities in like-positioned data bits of said first and second data words and generating a data bit error signal indicative thereof.

13. Apparatus as defined in claim 1 further including means for generating a word sync error signal if like-positioned clock bits in each of said received information words are absent from said information words.

14. The combination of:

A. a source of a first group of signals and another redundant source of a second group of the same signals, said first and second groups each including dissimilar parity signals indicative of a parity condition;

B. means for combining said first and second groups of signals to generate a corrected group of signals;

C. means for comparing the parity of said corrected group of signals with said parity condition indicated by said parity signals of said first and second groups of signals and generating a group error for a dissimilarity therebetween.

15. The combination as defined in claim 14 further including means for detecting dissimilarities in like-positioned signals of said first and second groups and generating a signal error indicative thereof.

16. The combination as defined in claim 15 further including means for detecting similarities in said parity signals of said first and second groups of signals and thereby generating a parity signal error.

17. The combination as defined in claim 16 further including means for inhibiting the transfer of said corrected group of signals to a utilizing device when either said parity signal error or said group error is received in the same group time frame with said signal error.

* * * * *